United States Patent [19]

Kubersky et al.

[11] Patent Number: 4,808,562
[45] Date of Patent: Feb. 28, 1989

[54] PROCESS FOR ACTIVATING AND STABILIZING CATALYST COMPOSITIONS

[75] Inventors: Hans-Peter Kubersky, Solingen; Hans-Georg Rollberg, Duesseldorf, both of Fed. Rep. of Germany

[73] Assignee: Henkel Kommanditgesellschaft auf Aktien, Duesseldorf, Fed. Rep. of Germany

[21] Appl. No.: 80,192

[22] Filed: Jul. 30, 1987

Related U.S. Application Data

[63] Continuation of Ser. No. 811,088, Dec. 19, 1985, abandoned.

[30] Foreign Application Priority Data

Dec. 29, 1984 [DE] Fed. Rep. of Germany ....... 3447782

[51] Int. Cl.$^4$ .................... B01J 31/34; B01J 31/28; B01J 31/26
[52] U.S. Cl. .................... 502/172; 502/150; 502/151; 502/159; 502/173; 502/500; 518/713; 518/714; 568/885
[58] Field of Search ............... 502/150, 151, 172, 173, 502/301, 500

[56] References Cited

U.S. PATENT DOCUMENTS

| | | | |
|---|---|---|---|
| 1,052,469 | 2/1913 | Ellis | 502/259 |
| 1,078,541 | 11/1913 | Ellis | 502/173 |
| 3,379,635 | 4/1968 | Von Doehren | 204/284 |
| 3,838,070 | 9/1974 | Thomas, Jr. | 252/472 |
| 4,007,226 | 2/1977 | Reynolds | 260/563 |

FOREIGN PATENT DOCUMENTS

| | | |
|---|---|---|
| 0044412 | 12/1980 | European Pat. Off. |
| 2320192 | 10/1973 | Fed. Rep. of Germany. |
| 1555015 | 1/1969 | France. |
| 2180652 | 11/1973 | France. |
| 155390 | 6/1982 | German Democratic Rep. |

OTHER PUBLICATIONS

Chemical Abstracts–vol. 72 (1970), p. 280, 16100e.
Ullmanns Encyklopadie der technischen Chemie, 4th Edison, vol. 7, pp. 468–470, Verlag Chemie, Weinheim.

Primary Examiner—Paul E. Konopka
Attorney, Agent, or Firm—Ernest G. Szoke; Wayne C. Jaeschke; Henry E. Millson, Jr.

[57] ABSTRACT

A process for the production of catalyst materials stabilized in the active state, comprising activating the catalyst starting materials in a reducing gas atmosphere, impregnating the activated catalysts with the melt of a solid inert to the active catlayst, and solidifying the melt impregnation by cooling. The particulate catalyst starting material is passed under the reaction conditions of the activation stage through a reaction zone filled with the reducing gas atmosphere which is in direct contact with the melt of the impregnating solid; the activated catalyst material is introduced into this melt; subsequently removed therefrom; and the molten solid left to solidify. If desired, the impregnated catalyst material may be mechanically size-reduced.

28 Claims, 1 Drawing Sheet

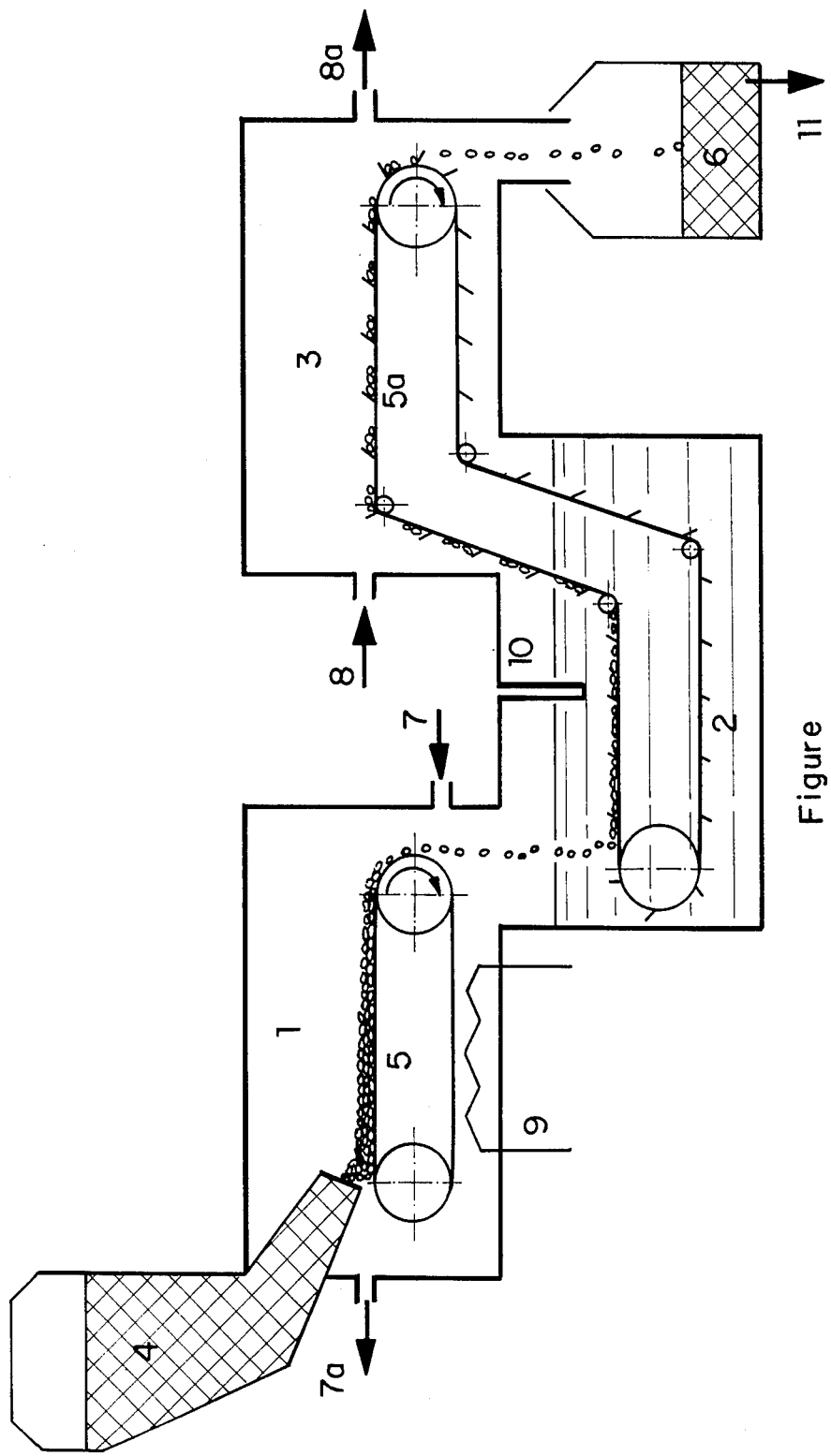

PROCESS FOR ACTIVATING AND STABILIZING CATALYST COMPOSITIONS

This application is a continuation of application Ser. No. 811,088, filed Dec. 19, 1985, now abandoned.

BACKGROUND OF THE INVENTION

1. Field of the Invention

The present invention relates to a process for activating catalysts in a reducing gas atmosphere and impregnating the activated catalysts with an inert melted solid.

2. Background of the Invention

Particulate catalyst compositions which are produced in particular in the form of tablets, extrudates or otherwise pelletized and which, before use, are activated by treatment in a reducing atmosphere, more especially in hydrogen or in a hydrogen-containing gas mixture, are widely used in industry. Such catalyst compositions generally consist of one or more catalytically active components, optionally in conjunction with inert supports. Known catalysts of this type include, in particular, metal and supported metal catalysts which are required and used for various hydrogenation processes. Catalysts of this type are often very sensitive to air in their activity to the point of pyrophoric behavior. Accordingly, stringent requirements have to be satisfied in the manufacture, storage, transport, and use of these catalysts.

In practice, there are various known methods for dealing with the problems involved, including the in situ activation of particulate catalysts in the reactor immediately before their use from shaped, particulate catalyst intermediates and passivation of the activated catalyst by partial re-oxidation. It is also known that powder-form catalyst may be kept in their active form by coating and/or impregnation with a protective composition which is eliminated when the catalysts are used. In catalytic processes of the type in question here, the in situ activation of the catalyst packing of a reactor is often preferred although this does involve serious reductions in the hydrogenation capacity of a plant as well as technical risks.

The production of air-sensitive active catalysts separately from the place and time at which they are used takes place to only a limited extent in practice. In particular, it is known that nickel hydrogenation catalysts can be stabilized by impregnation with solid fats, solid paraffin, fatty amines, or similar products. Thus, German Democratic Republic Patent No. 155,390 for example describes a process for the production of catalysts which consist of pyrophoric metal, optionally on inorganic supports, and which are impregnated with materials melting at temperatures above 315° K. In this process, the molten suspensions of catalyst and impregnating agent are said to be converted by spraying and simultaneous cooling into a fine-grained, free-flowing and air-stable form. French Patent No. 1,555,015 describes powder-form Raney nickel catalysts coated with a protective layer of materials melting at temperatures in the range of from 60° to 100° C., more especially hydrogenated vegetable oils, fatty acids or fatty acid salts, glycols, other polyhydric alcohols, or organic polymers. Solid layers of this type are said to be applied to the catalyst compositions by means of a solvent.

BRIEF DESCRIPTION OF THE DRAWINGS

The drawing (Figure I) sets forth the process of the invention in schematic form.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide an improved and generally useable process for the production and stabilization of both particulate and finely divided, especially powder-form, catalyst compositions in highly active form. More especially, the invention seeks to enable the catalyst compositions to be stored for weeks or even months under normal conditions although, without the stabilization of the invention, the untreated active catalysts show only limited stability or no stability in storage (for example in the case of pyrophoric catalyst compositions) under normal conditions. Above all, the invention seeks to enable the catalyst to be externally produced and activated, i.e. to enable the catalyst to be produced separately from the point of use, thus affording the following two major advantages:

1. relieving the production unit requiring the catalyst packing of the need to activate the catalyst, thereby considerably increasing the production capacity of the unit, and 2. the possibility of adjusting optimal parameters in the production of the catalyst, enabling catalysts of maximal activity to be produced.

Accordingly, the present invention relates to a process for the production of catalyst compositions stabilized in their active form by activation of starting catalyst compositions in a reducing gas phase, in which the active catalysts thus produced are subsequently stabilized by impregnation with a melt of a solid which is inert to the active catalyst and the melt impregnation is subsequently solidified by cooling. In the new process a particulate starting catalyst composition is passed under the reaction conditions of the activation stage and preferably continuously through a reaction zone which is filled with the reducing gas phase and which is in direct contact with the melt of the impregnating solid, and the activated catalyst composition is directly introduced, preferably continuously, from the reaction zone filled with the reducing gas phase into the melt of the impregnating solid and then removed therefrom, and, finally, the molten impregnating solid is allowed to solidify. If desired, the impregnated catalyst composition can then be mechanically size reduced.

It has proven to be of particular advantage for the catalyst composition which is normally activated at elevated temperature in the reducing gas phase to be directly introduced while it is still hot into a cooler melt bath of the impregnating solid and for the individual particles of catalyst to be impregnated as quickly as possible with the melt. The simplest way of doing this is to allow the particulate catalyst material still hot from the reduction stage to fall directly into the cooler melt bath of the impregnating solid.

It has been found that it is possible in this way to achieve thorough impregnation of the highly active solid catalyst particles with the melt of the impregnating solid in a relatively short time. In addition to the suction effect of the capillary structure, the reason for this may possibly be the rapid cooling of the hot catalyst particles in the melt liquid of the cooler impregnation bath and the reduced pressure suction which this creates in the interior of the solid catalyst particles. In any event, the result of the process of the invention is a catalyst material which is free from dust, shows considerably greater strength than the non-impregnated active material and may generally be stored in air for weeks or even months without significantly changing. If the melt impregnation is suitably removed from the catalyst compositions in the initial stages during use thereof, the catalysts develop their full activity even following long periods of storage.

The particulate starting catalyst materials used in the process of the invention, which according to the invention are converted into the active catalyst in known manner in a first process step by treatment with a reducing gas stream, are mixtures of various metal compounds which are described in detail in the prior art literature, among which corresponding oxides, hydroxides, carbonates, basic carbonates and the like are of particular practical significance. These materials or mixtures are generally converted by tabletting, extrusion or pelletizing into solid shapes which are ultimately converted into the active catalysts by reduction.

Under the definition used in the present invention, therefore, particulate catalyst material or rather the starting particulate catalyst material is understood to consist of corresponding shaped elements of considerable size which differ distinctly from standard powders. Average particle sizes of a particulate catalyst material of the type used in the present invention are in the range of from 0.5 to 20 mm, preferably in the range of from 2 to 10 mm and more preferably in the range of from 3 to 8 mm. The three-dimensional form of the particulate catalyst material can be either regular or irregular. The important factor is that the process of the invention does not start out from powder-form materials, but instead from comparatively large and coarse fragments of material having particle sizes within the above-mentioned ranges.

From the extensive prior-art literature on the subject of catalysts of this general type, reference is made purely by way of example to U.S. Pat. No. 4,007,226 which relates to the production of a catalyst for the hydrogenation of nitriles by mixing cobalt oxide with sodium silicate, shaping the mixture by tabletting, pelletizing or extrusion, drying and reduction with hydrogen at 300° to 500° C.

German Application No. 12 66 295 describes the production of a catalyst suitable for the hydrogenation of fatty acids to fatty alcohols. To this end, the carbonates of copper and zinc are reacted with chromic acid, the reaction product is tabletted and then reduced with hydrogen.

German Application No. 23 20 192 describes the production of a catalyst suitable for the synthesis of methanol from carbon monoxide and hydrogen by tabletting a mixture of copper oxide, zinc oxide and aluminium oxide and activating the tablets under normal pressure at 250° C. in a gas stream of 5% by volume of hydrogen and 95% by volume of nitrogen.

Finally, mention is made of iron-containing catalysts for the synthesis of ammonia which can be produced, for example, by dissolving promoter oxides ($Al_2O_3$, MgO, CaO, $K_2O$ etc.) in molten magnetite ($Fe_3O_4$), leaving the melt to cool, size-reducing the solidified melt by crushing and reducing the size-reduced product with hydrogen (Ullmanns Encyklopadie der technischen Chemie, 4th Edition, Vol. 7, pages 468–470, Verlag Chemie, Weinheim).

The details of activation, i.e. in particular the process conditions of the activation stage, such as temperature and pressure, the reducing gas phase to be used, which is generally hydrogen or a hydrogen-containing gas mixture and the like, are described at length in the prior art literature; to this extent, the general procedures apply to this step in the process of the invention. Once again, reference is made purely by way of example to European Application No. 0 044 412 which describes the activation of a catalyst intermediate consisting of copper oxide and zinc oxide by pressureless reduction with a mixture of 0.5 to 30 parts by volume of hydrogen and 99.5 to 70 parts by volume of nitrogen at temperatures in the range of from 150° to 250° C.

The present invention is characterized by the particular way in which, using the above general knowledge of those skilled in the art, it is possible in an external process optimally to produce active catalysts of uniform and maximal activity and subsequently to stabilize them for virtually indefinite periods. In one preferred embodiment of the invention, the particulate catalyst starting material is passed through the gas-filled activation stage in the form of a static layer. To this end, the particulate catalyst material is best applied to a web-form support, more especially to a belt-like or net-like support, and passed through the activation stage in the form of a static layer. In one preferred embodiment, the web-form support is arranged in the activation stage filled with the reducing gas phase and circulates therein. If the particulate catalyst starting material is applied, for example, to one end of this circulating support, the reaction conditions and the speed of circulation of the web-form support are coordinated with one another in such a way that the catalyst transported in the form of a static layer has reached the optimal state of activation on arrival at the other end of the supporting belt. This transport of the catalyst in the form of a static layer affords a considerable advantage: during the reducing conversion of the catalyst starting material to the active catalyst, the tablet strength of the particulate material is in general greatly reduced so that, in the event of mechanical movement, a considerable amount of dust would be formed and some of the particulate catalyst material might even ultimately be broken. This is avoided by the transport of the catalyst material through the activation zone in the form of a static layer.

In another embodiment of the invention, the layer thickness of the particulate catalyst material on the web-form support is preferably limited. According to the invention, this will always be of importance when there is any danger of exothermic reactions leading to overheating of the catalyst during the reductive activation of the catalyst compositions. It is well known that overheating of the catalyst can reduce its activity to the point of complete inactivation. It is known that, in the in situ activation of fixed catalyst beds in the reactors, there can be an uncontrolled increase in temperature which, in the most unfavorable case, can amount to several hundred degrees. In some cases, the catalyst can even become red hot. By limiting the layer thickness of the catalyst material on the support moving through the activation zone, it is possible reliably to avoid undesirable reactions such as these. Accordingly, it can be advisable to work with layer thicknesses of no more than 20 cm and preferably of no more than 10 cm, a layer thickness of no more than 5 cm being particularly suitable for a special form of the catalyst which will be described in detail hereinafter.

By suitably varying the process parameters, i.e. in particular by coordinating the temperature, pressure, gas composition and residence time of the catalyst, it is possible in a precisely defined manner to create conditions which provide for optimal reduction of the particular catalyst materials. Without leaving the installation or coming into contact with oxygen, the reduced active catalyst is then transferred to an immersion bath containing a melt of the impregnating solid which solidifies at room temperature. The catalyst is transported through the immersion bath, becomes impregnated with the stabilizing agent and finally enters a cooling zone where it is cooled to room temperature in an inert gas atmosphere, which results in solidification of the stabilizing agent. The catalyst reduced and stabilized in this way can then be packed in containers and stored indefinitely pending use.

In another embodiment of the invention, the particulate catalyst material is mechanically size-reduced after activation and stabilization. It has been found that the above-described activated and stabilized material is eminently suitable for the production of powder-form catalysts in activated and stabilized form. To this end, the described particulate catalyst materials activated by reduction with hydrogen and stabilized by impregnation are ground in a suitable mill to a powder having the desired particle size; the grinding process preferably being carried out with cooling to ensure that the impregnating agent does not melt and, in particular, takes on a brittle consistency. The grinding of solids with cooling to increase the tendency towards embrittlement of the material being ground and hence to facilitate sizereduction of that material is a technique known per se which is used in this embodiment of the invention. Thus, it is possible for example to carry out the grinding process at temperatures of down to -70° .C or even lower. The powder obtained is then packed into containers and may be stored in this form for weeks, even in the presence of air.

So far as the practical application of the process of the invention is concerned, the following general parameters may be applied. Basically, the impregnating solids used may be any compounds which are solid at room temperature, which melt in a reasonable temperature range, i.e. above about 25° C. and better still above 30° C., and which do not affect the activity of the active catalyst in contact therewith. The organic components which have already been used for this purpose in the past, such as solid fat, solid paraffin, fatty amine and also corresponding dihydric and polyhydric alcohols, fusible organic polymers, for example polyalkoxide compounds, and the like are suitable impregnating solids. Particularly important stabilizing solids are paraffins, fats and other fatty acid compounds, more especially corresponding esters with monohydric alcohols, waxes or wax esters and the like. An embodiment of the invention which is described in detail below uses fatty alcohols and/or wax alcohols as the impregnating agent solidifying at room temperature.

Catalysts of the present type have particular use in the hydrogenation of organic compounds. Accordingly, it can be of advantage, in one embodiment of the invention, to stabilize the activated catalyst material with the starting material used in the subsequent process and/or with the reaction product accumulating in that process. It is of particular advantage to use the reaction product to be ultimately obtained with these catalysts. This ensures from the outset that, where a new catalyst batch is used, no foreign substances are introduced into the production process.

According to the invention, the temperature difference between the bath temperature of the impregnating solid and the reaction temperature in the activation stage is preferably at least 80° C. and more preferably at least 120° C. Since the hydrogenating activation of solid catalysts of the present type generally takes place at temperatures of at least 180° C. and more especially at temperatures of from 200° to 350° C., no problems are involved in carrying out this variant of the process. The immersion bath of an impregnating material having a melting point of at least about 40° C. and preferably at least about 45° C. may then be kept at temperatures of, for example, from 50° to 120° C. The hot, freshly activated particulate catalyst falls directly from its supporting belt into the immersion bath of the impregnating solid and is removed therefrom, again preferably continuously, into the cooling zone filled with inert gas.

In one preferred embodiment, a circulating belt-like support is also provided in the immersion bath, projecting at one end from the immersion bath and extending into a following process section best filled with inert gas. The catalyst falling into the immersion bath is guided onto the supporting circulating through this bath and the following inert gas zone. The speed of circulation and immersion length of the support in the bath and hence the residence time of the catalyst material in the immersed state are coordinated in such a way as to guarantee the desired state of thorough impregnation.

The process of the invention can be of particular significance for the external production of catalysts for the reduction of fatty acid esters and/or fatty acids to fatty alcohols, particularly saturated fatty alcohols. To produce fatty alcohols of the above type, fatty acid methylester is normally reacted with hydrogen on a solid catalyst at a temperature of from 200° to 250° C. and under a pressure of from 200 to 300 bar. The catalyst is introduced in particulate form, for example as tablets or granulate, into cylindrical reactors having a capacity of several cubic meters. Hitherto, the starting catalyst material consisting, for example, of oxides, hydroxides, carbonates and/or basic carbonates of copper and other heavy metals in admixture with promoters has been activated by initially drying this particulate catalyst starting material in a stream of nitrogen at temperatures of up to about 200° C. in the reactor in which the hydrogenation is subsequently carried out and then reducing the catalyst thus dried by introducing hydrogen at about the same temperature. The entire process takes about 4 to 14 days, depending on the quantity of catalyst used. The catalyst is then active and is now capable of catalyzing the hydrogenation of fatty acids to fatty alcohols. At the same time, however, it has become pyrophoric, i.e. it cannot be handled in air without immediately catching fire. Since the strength of the tablets is also greatly reduced by the reduction, activation and subsequent hydrogenation of the esters have to be carried out in the same reactor. However, this means that the reactor is unavailable for fatty alcohol production during the activation phase. In this way, large hydrogenation plants lose about 15% of their capacity.

If, by contrast, the particulate catalyst starting material is first reduced in an external process in accordance with the invention and then stabilized by impregnation in a hydrogen atmosphere or in an inert gas atmosphere with an impregnating agent which, although liquid at elevated temperature, solidifies at room temperature, these disadvantages do not arise. The process is particularly simple to carry out where fatty alcohols or fatty alcohol mixtures liquid at elevated temperature, but solidifying at room temperature are used for impregnation. The active catalysts containing the fatty alcohol solidified at room temperature are dust-free, have a considerably greater strength than reduced tablets or granulates which have not been impregnated with fatty alcohol and may be stored in air for months without significant changes.

Fatty alcohol mixtures of the type known as "tallow alcohol" are particularly suitable for stabilizing the active catalysts, although it is also possible to use fatty alcohols of uniform chain length, such as cetyl alcohol, stearyl alcohol or behenyl alcohol. Apart from fatty alcohols, however, it is also possible to use other substances for stabilizing the catalyst providing they have similar melting points to the fatty alcohols mentioned and do not enter into any chemical reactions or adversely affect the activity of the catalyst under the prevailing conditions. Suitable substances of this type include, for example, wax esters and paraffins. As already mentioned, fatty alcohols have the advantage that, in the subsequent application envisaged for the catalyst, they do not introduce any foreign substances as impurities into the fatty alcohol produced.

In addition to the catalysts used for the production of fatty alcohols, it is also possible to stabilize other solid catalysts, which have to be activated before use by reduction with hydrogen and which are then sensitive to air, in accordance with the invention by impregnation with fatty alcohols or similar substances. Catalysts such as these are, for example, the copper/zinc oxide and copper/zinc oxide/aluminium oxide (chromium oxide) catalysts used for the synthesis of methanol by the low-pressure process.

The advantages of the process of the invention—particularly the fact that the catalyst does not have to be activated at the hydrogenation plant and also the possibility of adjusting optimal parameters in the reduction of the catalyst - are also in evidence in cases where hydrogenation catalysts which do not become sensitive to air or even pyrophoric as a result of reduction are activated in the reduction plant. Catalysts such as these are, for example, the copperfree chromium catalysts used for the production of unsaturated fatty alcohols from unsaturated fatty acid methylesters or the copper-containing chromium catalysts used for the production of saturated fatty alcohols by direct hydrogenation of fatty acids.

Typical process conditions for the reduction of a particulate catalyst starting material in the reduction or activation stage are, for example:
Composition of the reduction mixture: 30 to 60 parts by volume of hydrogen and 70 to 40 parts by volume of nitrogen.
Temperature: 180° to 250° C. Pressure: 1 bar. Residence time in the reduction zone: 1 to 3 hours.

These conditions apply to a copper-containing catalyst for the production of saturated fatty alcohols from fatty acid esters. However, they may also be modified without disadvantage within the scope of general specialist knowledge. For example, pure hydrogen can also be used as the reducing gas.

In the production of other catalysts, it may be necessary, as already known, to modify the reduction conditions to an even greater extent. Thus, a chromium-containing catalyst for the production of unsaturated fatty alcohols is activated for 4 to 8 hours (residence time in the reduction zone) at temperatures of from 250° to 320° C.

The basic construction of a continuous reduction plant suitable for the purposes of the invention is described in detail below with reference to the Figure:

Particulate non-reduced catalyst starting material (non-reduced catalyst intermediate) 4 is introduced into the reduction zone 1 which is purged with a reducing gas phase, particularly hydrogen or mixtures of hydrogen and inert gas, through the inlet pipe 7 and the outlet pipe 7a. The particulate catalyst starting material 4 is applied to a first conveyor belt 5 in a predetermined layer thickness of, for example, from 5 to 10 cm and is transported through the reduction zone 1 on that conveyor belt. The temperature of the reduction zone 1 is controlled through heating element 9. The speed at which the catalyst material is transported is coordinated with the other process conditions prevailing in reduction zone 1 in such a way that the catalyst activated to a predetermined extent leaves the conveyor belt. It falls into the immersion bath 2 which is in direct spatial communication with the reduction zone and which is filled with molten impregnating liquid. The barrier plate 10 separates the surface of the immersion bath into two regions. The left-hand region is in direct contact with the reduction zone 1, while the right-hand region leads into the cooling zone 3. A conveyor belt 5a travels through the immersion bath 2 and the cooling zone 3. The catalyst falling from the conveyor belt 5 into the immersion bath 2 drops onto the conveyor belt 5a and remains in the immersion bath until the thorough impregnation of the particulate catalyst material required in accordance with the invention has taken place. The conveyor belt 5a laden with catalyst then leaves the immersion bath 2 and psses through the cooling zone 3 in which the liquid impregnating agent from immersion bath 2 solidifies in and on the active catalyst and thus stabilizes it against the penetration of air. The stabilized active catalyst material 6 cooled in this way is collected in collecting bin 12 and may be removed through outlet 11 and, if desired, delivered to a size-reducing unit, for example to a cooled grinding machine. However, the particulate catalyst material may also be packed as such and stored as required. The cooling zone 3 is purged with inert gas through inlet 8 and outlet 8a.

The invention will be illustrated but not limited by the following example.

EXAMPLE

The starting material used was the initial stage, prepared from CuO, ZnO and $Al_2O_3$ in a 50:40:10 weight ratio, of a catalyst suitable for the synthesis of methanol from carbon monoxide and hydrogen. This material had been obtained by mixing a solution containing copper nitrate, zinc nitrate, and $\gamma$-aluminum oxide at 90° C. up to a pH value of 7 with a sodium carbonate solution, filtering off the precipitate formed, washing, drying and calcining at 350° C. The powder washed in this manner was pressed into cylindrical tablets, 5 mm high and 5 mm in diameter.

The activation of the catalyst tablets was performed in a continuously operating reduction unit in accordance with the drawing and the above description. The tablets were discharged from a storage container onto the conveyor belt passing through the reduction zone. The speed of the conveyor belt was adjusted such that the residence time of the tablets in the reduction zone amounted to 2½ hours. A mixture of 50 vol-% hydrogen and 40-vol-% nitrogen was used as the reducing gas. The temperature was 170° C. in the first one-third of the reduction zone, 190° C. in the second onethird, and 210° C. in the third one-third. The layer thickness of the catalyst load on the conveyor belt at low point exceeded two tablet diameters.

After passing through the reducing zone the tablets were let out into an immersion bath of tallow alcohol heated to 80° C. After a residence time of 5 min the tablets loaded with tallow alcohol were removed from the immersion bath using the conveyor belt provided for this and conveyed through a cooling zone, in which nitrogen at 12° C. flowed over them counter-current to their movement. After a residence time of 20 min in the cooling zone, the tallow alcohol taken up by the catalyst was completely solidified, and the catalyst was protected against contact with air in this manner.

The catalyst tablets treated in this way retained their full catalytic activity even after months of storage.

What is claimed is:

1. A process for the preparation of an activated catalyst composition comprising the steps of
   A. contacting a shaped particulate catalyst starting material comprising at least one of Cu, Zn, Cr, or an oxide, hydroxide, carbonate, or basic carbonate thereof with a reducing gas in an activation zone at a temperature in the range of from about 200° C. to about 350° C. to produce an activated particulate catalyst for the reduction of a fatty acid or ester thereof to the corresponding alcohol;
   B. impregnating the activated particulate catalyst in an impregnation zone in the presence of said reducing gas with a melted impregnating solid consisting essentially of a fatty alcohol or fatty alcohol mixtures at a temperature of from about 50° C. to about 120° C., said melted solid being inert to the activated catalyst and having a melting point of at least about 40° C.;
   C. separating the impregnated activated particulate catalyst from the melted impregnating solid after substantially complete impregnation of the catalyst; and
   D. solidifying the impregnating melted solid present on the catalyst;
   wherein the activation zone temperature is at least about 80° C. higher than the impregnation zone temperature, and the activated catalyst is at a higher temperature than the melted impregnating solid on contact therewith.

2. A process in accordance with claim 1 wherein the resulting impregnated catalyst is mechanically reduced in size.

3. A process in accordance with claim 1 wherein the activation zone temperature is at least about 120° C. higher than the impregnation zone temperature.

4. A process in accordance with claim 1 wherein in step A. the shaped particulate catalyst starting material is in the form of tablets, extrudates or pellets.

5. A process in accordance with claim 1 wherein in step A. the particulate catalyst starting material is passed through a reducing gas-filled activation zone in the form of a static layer having a thickness no greater than about 10 cm.

6. A process in accordance with claim 5 where said layer thickness is no greater than about 5 cm.

7. A process in accordance with claim 1 wherein step A. is carried out by applying the particulate catalyst starting material in the form of a thin layer to a webform support circulating in a reaction zone filled with a reducing gas at a temperature of from about 200° to about 350° C.; step B. is carried out by continuously allowing the hot activated catalyst to fall into a bath of the melted impregnating solid maintained at a temperature of from about 50° to about 120° C.; step C. is carried out by continuously removing the impregnated catalyst from the bath; and step D. is carried out by continuously introducing the impregnated catalyst into a cooling zone filled with an inert gas and maintaining the impregnated catalyst therein until the impregnating layer has solidified.

8. A process in accordance with claim 7 wherein in step B. the activated catalyst falling into the bath is guided onto a moving support which circulates through the bath, removes the impregnated catalyst in step C., and then carries the impregnated catalyst into the cooling zone in step D.

9. A process in accordance with claim 2 wherein the mechanical reduction of the catalyst is carried out with cooling sufficient to prevent melting of the impregnating solid.

10. A process in accordance with claim 1 wherein the catalyst composition is a hydrogenation catalyst composition.

11. A process in accordance with claim 1 wherein the impregnating solid has a melting point of at least about 45° C.

12. A process in accordance with claim 1 wherein the melted impregnating solid in step B. is identical to either the starting material or the end product with which the resulting catalyst is to be used.

13. A process in accordance with claim 1 wherein in step A. the particulate catalyst starting material has a particle size in the range of from about 0.5 to about 20 mm.

14. A process in accordance with claim 13 wherein said particle size is in the range of from about 2 to about 10 mm.

15. A process in accordance with claim 7 wherein the reaction zone in step A. is open to and in direct contact with the bath of melted impregnating solid in step B.

16. A process in accordance with claim 12 wherein the melted impregnating solid in step B. is a fatty alcohol.

17. The process of claim 1, wherein the catalyst comprises copper in combination with one or more oxides of zinc, aluminum, or chromium.

18. The process of claim 1, wherein the catalyst comprises $CuO/ZnO/Al_2O_3$.

19. A process for the preparation of a stabilized, shaped hydrogenation catalyst for converting a fatty acid or fatty acid ester to the corresponding fatty alcohol comprising
   (a) shaping a catalyst material adapted to catalyze the reduction of a fatty acid or ester thereof to the corresponding fatty alcohol to a particle size of at least about 0.5 mm;
   (b) activating the shaped catalyst material by exposing the catalyst material to a reducing gas at an activation temperature of from about 200° C. to about 350° C. to form an activated shaped catalyst;

(c) impregnating the activated shaped catalyst with a melted impregnating solid consisting essentially of a fatty alcohol or mixture thereof having a melting point of from about 30° C. to about 120° C.;

(d) separating the impregnated activated catalyst from the impregnating melted solid after substantially complete impregnation of the catalyst; and (e) cooling the impregnated catalyst to solidify the impregnating melted solid to form a stabilized, shaped catalyst; wherein the activation temperature is at least about 80° C. higher than the impregnating temperature and the activated catalyst is at a higher temperature than the melted impregnating solid on contact therewith.

20. The process of claim 19, wherein the catalyst comprises an oxide, hydroxide, or carbonate of copper, a copper-free chromium catalyst, or a copper-containing chromium catalyst.

21. The process of claim 19, wherein the catalyst material is adapted to catalyze the reduction of an unsaturated fatty acid or ester thereof to the corresponding unsaturated fatty alcohol.

22. The process of claim 19, wherein the catalyst material is adapted to catalyze the reduction of a methylester of an unsaturated fatty acid to the corresponding unsaturated fatty alcohol.

23. The process of claim 19, wherein the impregnating solid is a tallow alcohol fatty alcohol mixture.

24. The process of claim 22, wherein the catalyst material is a copper-free chromium catalyst.

25. The process of claim 19, wherein the impregnating melted solid has a melting point of at least about 40° C.

26. The process of claim 19, wherein the activation temperature is at least about 120° C. higher than the impregnating temperature.

27. The process of claim 19, wherein the average particle size of the shaped catalyst is from about 2 to 10 mm.

28. The process of claim 19, wherein the average particle size of the shaped catalyst is from about 3 to 8 mm.

* * * * *

UNITED STATES PATENT AND TRADEMARK OFFICE
CERTIFICATE OF CORRECTION

PATENT NO. : 4,808,562
DATED : February 28, 1989
INVENTOR(S) : Hans-Peter Kubersky, Hans-Georg Rollberg It is certified that error appears in the above-identified patent and that said Letters Patent is hereby corrected as shown below:

At Col. 1, line 37, "catalyst" should read --catalysts--.

At Col. 9, line 36, in claim 1, after "corresponding" should read --fatty--.

At Col. 9, line 41, in claim 1, "mixtures" should read --mixture--.

At Col. 11, line 22, in claim 21, after "reduction of" delete --an unsaturated-- and add --a--.

Signed and Sealed this

Eighteenth Day of July, 1989

Attest:

DONALD J. QUIGG

Attesting Officer

Commissioner of Patents and Trademarks